United States Patent [19]
Meyer et al.

[11] Patent Number: 5,515,933
[45] Date of Patent: May 14, 1996

[54] DEVICE FOR RECOGNIZING A CHILD'S SEAT WHICH IS STRAPPED TO THE FRONT PASSENGER'S SEAT OF A MOTOR VEHICLE

[75] Inventors: Michael Meyer, Sindelfingen; Volker Petri, Aidlingen; Reinhold Mickeler, Altdorf; Manfred Mueller, Deizisau; Luigi Brambilla, Boeblingen, all of Germany

[73] Assignee: Mercedes-Benz AG, Stuttgart, Germany

[21] Appl. No.: 408,609

[22] Filed: Mar. 23, 1995

[30] Foreign Application Priority Data

Mar. 23, 1994 [DE] Germany ............... 44 09 971.1

[51] Int. Cl.⁶ .................................................. B60R 21/02
[52] U.S. Cl. .......................................... 180/273; 280/735
[58] Field of Search ................................. 180/268, 273; 280/728.1, 730.1, 735

[56] References Cited

U.S. PATENT DOCUMENTS

| | | | |
|---|---|---|---|
| 5,074,583 | 12/1991 | Fujita et al. | 280/735 |
| 5,232,243 | 8/1993 | Blackburn et al. | 180/273 |
| 5,234,228 | 8/1993 | Morota et al. | 180/273 |
| 5,361,865 | 11/1994 | Lindner | 180/273 |

FOREIGN PATENT DOCUMENTS 3635644 4/1987 Germany.
4237072 12/1993 Germany.

OTHER PUBLICATIONS

Research Disclosure, No. 359, Mar. 10, 1994, (Emsworth, England), PP. 108–109, Ref. No. RD35909 J. P. Kelley, "Passive RF Technique for Disabling Passenger Side Airbag When Used With a Rearward Facing Infant Seat".

Research Disclosure, No. 358, Feb. 10, 1994, (Emsworth, England), p. 64, Ref. No. RD 35804, (Anonymous), "Passenger Side Air Bag Deployment Inhibit".

Research Disclosure, No. 355, Nov. 10, 1993, (Emsworth, England), p. 724, Ref. No. RD35519, (Anonymous), "Infant Seat Detection System".

*Primary Examiner*—Kenneth R. Rice
*Attorney, Agent, or Firm*—Evenson, McKeown, Edwards & Lenahan

[57] ABSTRACT

A device for recognizing a child's seat which is strapped to the front passenger's seat of a motor vehicle is provided. Such a device is required in order to inhibit release of a front seat passenger's side airbag when a child's seat is strapped on the front passenger's seat. An identification carrier, for example, an electrical tuned circuit or an intelligent data carrier, which attenuates an electromagnetic measurement field in a characteristic manner, is fitted to the child's seat. The presence and, possibly, also the type of child's seat used can be recorded.

16 Claims, 1 Drawing Sheet

U.S. Patent
May 14, 1996
5,515,933
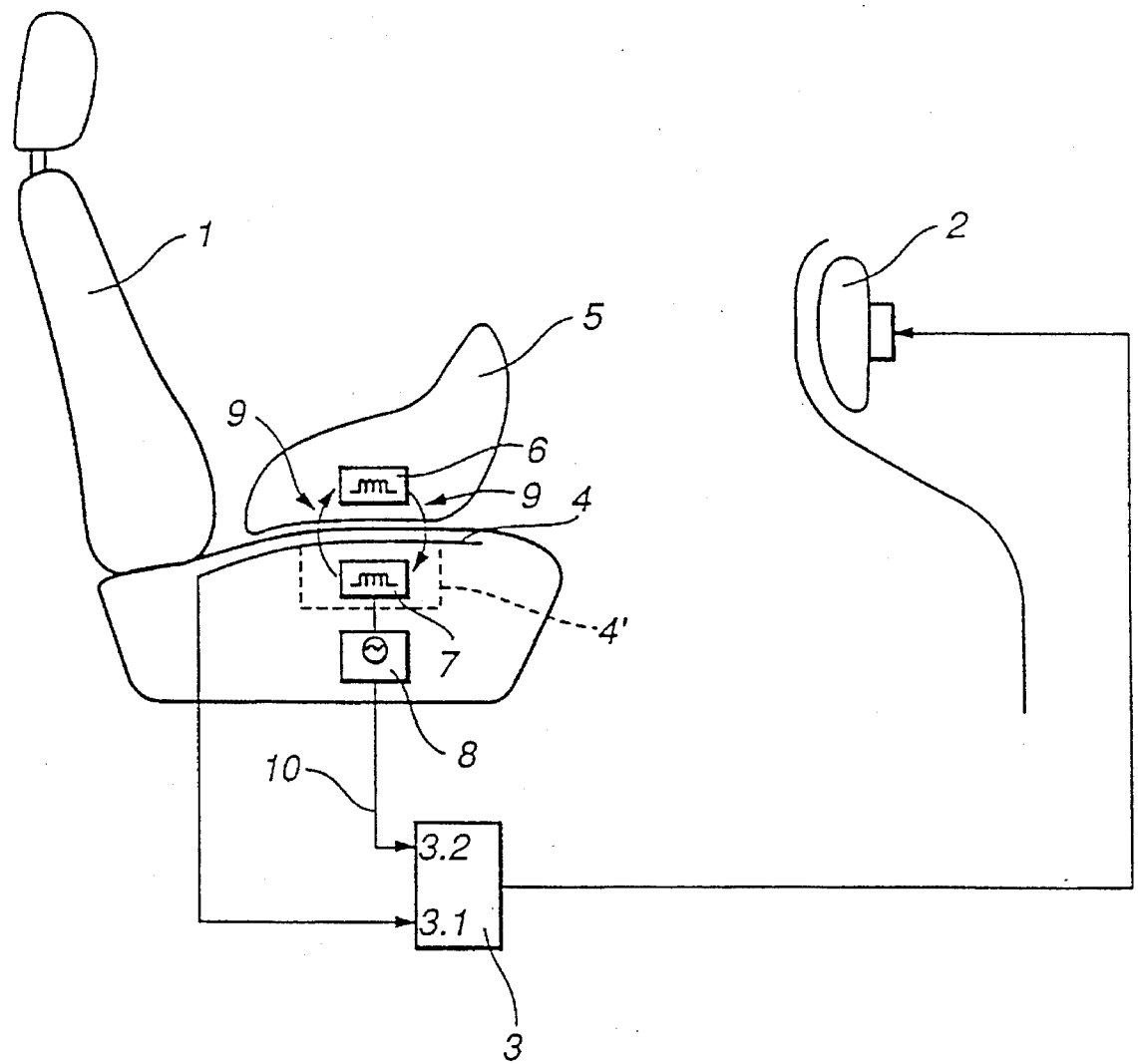

DEVICE FOR RECOGNIZING A CHILD'S SEAT WHICH IS STRAPPED TO THE FRONT PASSENGER'S SEAT OF A MOTOR VEHICLE

BACKGROUND AND SUMMARY OF THE INVENTION

The invention relates to a device for recognizing a child's seat which is strapped to the front passenger's seat of a motor vehicle.

In the case of motor vehicles having a built-in front seat passenger's side airbag, the degree of injury to the front seat passenger in the event of a frontal impact is reduced in that the airbag is triggered and is changed into a state in which it provides a protective effect. However, if the front passenger's seat is occupied by a child in a child's seat, airbag release is undesirable since an optimum protective effect of the airbag is not ensured and an additional risk of injury by the airbag cannot be precluded for all types of child seats. This applies, in particular, for child's seats (reboard seats) which face the rear of the vehicle.

A resistive membrane pressure sensor, which is constructed as a sensor mat for seat occupancy detection is known from German Patent document DE 42 37 072 C1. Since such a membrane pressure sensor emits an analog signal which depends on the normal force on its surface, the sensor mat cannot only be used to recognize whether or not the seat is occupied, but a coarse interrogation of the weight resting on the seat can also be carried out. A lower limit value of, for example, 12 kg can then be set, beneath which airbag release is suppressed. This is based on the assumption that, if the weight is less than this, the seat is either unoccupied or is occupied by a child in a child's seat. This method is very imprecise, since a consistent definition of the lower limit value is impossible: this is because both the weight of the child and the weight of the child's seat are subject to a wide band spread. In addition, the various seat types differ greatly from one another in the local load on the seat surface, which can corrupt the weight measurement.

There is therefore needed a technical solution by means of which the presence of a child's seat on the front passenger's seat can be detected in a simple and reliable manner.

This need is met according to the present invention by a device for recognizing a child's seat which is strapped to the front passenger's seat of a motor vehicle. A base station in the interior of the vehicle emits an electromagnetic measurement field. An identification carrier, by means of which the measurement field is physically changed in a characteristic manner, is fitted to the child's seat. A change in the measurement field can be recorded by the base station. When a change in the measurement field occurs which is characteristic of an identification carrier moved into the measurement field, the base station emits a corresponding identification signal.

The device according to the present invention has the advantage that the child's seat recognition is not based on a weight measurement and is thus independent of the weight of the child in the child's seat. The child's seat recognition according to the invention is dependent only on the child's seat being provided with an identification carrier. This can either already been integrated in the child's seat in the factory, or can be subsequently fitted as a cost-effective retrofitted part without any problems, for example by bonding or clipping on. Since the identification carrier is recognized without making contact by means of a measurement field, on the one hand no wear occurs and on the other hand handling of the child's seat is not adversely affected.

A suitable principle for physical marking by means of an identification carrier is known per se and is used, for example, in warehouses for marking goods which have not yet been purchased by a buyer. In this case, the identification carrier in the simplest case comprises a tuned circuit, which is made up of a coil and a capacitor, and attenuates a radio-frequency electromagnetic field, which is emitted from a base station, in a characteristic manner.

Another type of identification carrier is known, for example, from manufacturing technology and is described in the article by S. Drews and W. P. Schmidt, "Datentrager werden intelligent" (Data carriers become intelligent) in me, Volume 6 (1992), Issue 2. Intelligent, programmable data carriers are now used in manufacturing. The carriers are fitted directly on the workpiece and are used as information which accompanies the material. The data carriers can be read without making contact. They are supplied inductively from the base station and thus do not require their own electrical power supply either for reading or programming, or for maintaining the data. Such a data carrier can be implemented cost-effectively and essentially comprises a coil, possibly a capacitor for tuning, and an integrated circuit chip. The base station produces a constant electromagnetic alternating field in the frequency range from 100 kHz–50 MHz. If the data carrier comes into the range of the transmitting coil, then it obtains its energy by transformer coupling and starts to read its stored data and to transmit the data to the base station. The transmission is based on a method which is known from transponders and in the case of which the electromagnetic alternating field is amplitude-modulated by different attenuation by the identification carrier. The base station evaluates the modulation.

One advantageous design is for the transmitting coil to be integrated in a seat occupancy sensor which is constructed as a sensor mat.

Other objects, advantages and novel features of the present invention will become apparent from the following detailed description of the invention when considered in conjunction with the accompanying drawings.

BRIEF DESCRIPTION OF THE DRAWING

The sole FIGURE is a diagrammatical illustration of a front passenger's seat having a child's seat and a recognition device according to the present invention.

DETAILED DESCRIPTION OF THE DRAWING

The single FIGURE shows a front passenger's seat 1 with a child's seat 5 which is strapped thereon and points to the rear. An airbag 2 is assigned to the front passenger's seat 1. The airbag 2 is triggered in a manner known per se by a release controller 3. The release controller 3 can be a hardwired circuit or a suitably programmed microprocessor. The release controller 3 passes a triggering signal to the airbag 2 in the event of a dangerous impact. Furthermore, a seat occupancy sensor 4 can be provided in a manner which is known per se and is connected to a first input 3.1 of the release controller 3. The airbag release is enabled only when the seat occupancy sensor 4 triggers the input 3.1 in a manner which is typical of seat occupancy by an occupant. On the other hand, unnecessary airbag release when the front passenger's seat 1 is unoccupied is thus suppressed.

According to the present invention, a base station 8 is provided which emits an electromagnetic alternating field 9 by means of a base antenna 7 which is integrated in the front passenger's seat 1 and is constructed as a transmitting coil. If a child's seat 5 with an identification carrier 6 fitted thereto is now moved into the region of the field 9, then the interaction with the identification carrier 6 produces characteristic attenuation of the field 9. The change in the field 9 is recorded by the base station 8, and a corresponding identification signal 10, which indicates at least the presence of a child's seat, is passed to the second input 3.2 of the release controller 3. This signal influences the readiness of the release controller 3 to release in such a manner that release is made more difficult or is inhibited if the identification signal 10 indicates that the seat is occupied by a child's seat 5.

In a first embodiment, the identification carrier 6 comprises a tuned circuit which is made up of a coil and a capacitor. The electromagnetic alternating field 9 is tuned to the resonant frequency of the tuned circuit so that the alternating field is highly attenuated when the identification carrier 6 comes into the close region of the field 9. The attenuation can be recognized as a voltage drop in the base station 8.

In a second embodiment, a method can be provided in the case of which the frequency of the alternating field 9 is modulated in a periodically recurring manner ("wobbled") and the absorption spectrum is used to conclude that the identification carrier 6 is present. This method offers the advantage that incorrect tuning, resulting from component tolerances, has no influence. Differences between various types of child's seats can also be sensed, in that a dedicated resonant frequency is provided for each type, to which resonant frequency the tuned circuit is tuned. It is thus possible to set the release controller 3 differently in relation to the type of child's seat.

In a third embodiment, the identification carrier 6 comprises an intelligent data carrier, as has already been mentioned above. Comprehensive information relating to the child's seat can be stored on the data carrier. This information, once it has been read by the base station 8, can be used to produce a reaction of the safety system which is optimally matched to the child's seat. In addition to type statements, the stored information can, for example, also contain statements on the dimensions, weight and material.

For the two last embodiments, which allow differentiation in relation to the type of child's seat, it is also conceivable to subject the signals from the seat occupancy sensor 4 and the identification signal 10 to combined evaluation logic, in order to influence the release controller 3. For example, inhibition of the release controller 3 can be made dependent on whether, in the case of a specific type of child's seat, a specific weight recorded by the seat occupancy sensor 4 is also below a limit value, it being possible for this limit value to be dependent on the type of child's seat. In general, matching of further components of the safety system, for example belt tighteners, to the type of child's seat can also be provided.

The device according to the invention can be combined in an advantageous manner with a seat occupancy sensor 4 which is constructed as a resistive membrane pressure sensor in accordance with German Patent document DE 42 37 072 C1. The base antenna 7, which is constructed as a transmitting coil, can be integrated without any major outlay into the conductor track structure of the membrane pressure sensor, using the same screen-printing production method, so that the base antenna 7 is an integral component of a seat occupancy sensor 4'. The diameter of a typical transmitting coil is in the range of from 2 cm–20 cm. The connections of the base antenna 7 can be passed out separately, or a conductor track section of the membrane pressure sensor 4' is constructed in such a manner that it can be used as the base antenna 7, the radio-frequency alternating field 9 being injected via the already existing connections for seat occupancy detection, while the contact pressure can be measured in a known manner using a direct-current measurement. In this embodiment, no additional cabling outlay is required and it is obvious for the base station 8 to be integrated in the evaluation station 3. As a result, the seat occupancy sensor which is known from German Patent document DE 42 37 072 C1 and is constructed as a resistive membrane pressure sensor can be developed such that it can be used at the same time for child's seat recognition.

In order to keep the radiation load on the occupant low, the interrogation by the measurement field 9 can also take place in a pulsed manner, so that, for example, a child's seat interrogation is carried out on a once a minute cycle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for recognizing a child's seat which is strapped to a front passenger's seat of a motor vehicle, comprising:

a base station arranged in an interior of the motor vehicle, said base station emitting an electromagnetic measurement field;

an identification carrier fitted to the child's seat, said identification carrier physically changing said electromagnetic measurement field in a characteristic manner;

wherein a change in the measurement field is recorded by the base station;

wherein, when a change in the measurement field occurs which is characteristic of an occupancy of said child's seat equipped with said identification carrier, said base station emits a corresponding identification signal; and wherein a base antenna is an integral component of a seat occupancy sensor which is constructed as a sensor mat which comprises a conductor track constructed so as to detect the occupancy of the child's seat.

2. A device according to claim 1, wherein said base antenna has connections which are passed out separately from said conductor track.

3. A device according to claim 1, wherein the conductor track of the seat occupancy sensor is at the same time used as the base antenna, in that, the conductor track is constructed in a limited region as a transmitting coil, a radio-frequency measurement field being injected via the connections to the seat occupancy detection device.

4. A device according to claim 3, further comprising an evaluation unit for the seat occupancy sensor, wherein said base station is integrated into said evaluation unit.

5. A device according to claim 1, wherein the base antenna is applied with a screen printing method, together with the conductor track for seat occupancy detection, onto a polymer carrier sheet.

6. A device according to claim 2, wherein the base antenna is applied with a screen printing method, together with the conductor track for seat occupancy detection, onto a polymer carrier sheet.

7. A device according to claim 3, wherein the base antenna is applied with a screen printing method, together with the conductor track for seat occupancy detection, onto a polymer carrier sheet.

8. A device according to claim 1, wherein the identification carrier comprises an electrical circuit having a coil.

9. A device according to claim 8, wherein said electric circuit is tuned to a resonance frequency characteristic of a type of said child seat.

10. A device according to claim 1, wherein the identification carrier is an intelligent data carrier on which specifying statements relating to the child's seat are stored and which can be read, without making contact, by the base station.

11. A device according to claim 1, wherein a release controller for an airbag is triggered by the identification signal; and wherein when an identification signal is present which indicates the presence of a child's seat, the release controller is switched into a state which results in airbag release being inhibited.

12. A device according to claim 9, wherein a release controller for an air bag is controlled by the identification signal and a seat occupancy signal of said seat occupancy sensor such that a release of said air bag is blocked only when a presence of said child seat is detected and a weight recorded by said seat occupancy sensor falls below a limit value relative to said child seat.

13. A device according to claim 10, wherein a release controller for an air bag is controlled by the identification signal and a seat occupancy signal of said seat occupancy sensor such that a release of said air bag is blocked only when a presence of said child seat is detected and a weight recorded by said seat occupancy sensor falls below a limit value relative to said child seat.

14. A device according to claim 1, wherein the measurement field is emitted in a pulsed manner.

15. A device for recognizing a child's seat which is strapped to a front passenger's seat of a motor vehicle, comprising:

a base station arranged in an interior of the motor vehicle, said base station emitting an electromagnetic measurement field;

an identification carrier fitted to the child's seat, said identification carrier physically changing said electromagnetic measurement field in a characteristic manner;

wherein a change in the measurement field is recorded by the base station;

wherein, when a change in the measurement field occurs which is characteristic of said identification carrier being moved into the measurement field, said base station emits a corresponding identification signal; and wherein a base antenna is an integral component of a seat occupancy sensor which is constructed as a sensor mat.

16. A child's seat which can be strapped to a front passenger's seat of a motor vehicle, comprising an identification carrier, which interacts with a recognition device being fitted to the child's seat, wherein the recognition device include:

a base station arranged in an interior of the motor vehicle, said base station emitting an electromagnetic measurement field;

an identification carrier fitted to the child's seat, said identification carrier physically changing said electromagnetic measurement field in a characteristic manner;

wherein a change in the measurement field is recorded by the base station;

wherein, when a change in the measurement field occurs which is characteristic of said identification carrier being moved into the measurement field, said base station emits a corresponding identification signal; and wherein a base antenna is an integral component of a seat occupancy sensor which is constructed as a sensor mat.

* * * * *